United States Patent [19]
Leu et al.

[11] Patent Number: 5,901,054
[45] Date of Patent: May 4, 1999

[54] PULSE-WIDTH-MODULATION CONTROL CIRCUIT

[75] Inventors: Ching-Shan Leu, Taoyuan; Jeang Hwang, Taoyuan Hsien; Wueichan Liu, Kaohsiung, all of Taiwan

[73] Assignee: Chun-Shan Institute of Science and Technology, Taoyuan Hsien, Taiwan

[21] Appl. No.: 08/993,297

[22] Filed: Dec. 18, 1997

[51] Int. Cl.$^6$ .............................. H02M 1/12; H02M 3/24; H02M 3/335

[52] U.S. Cl. .............................. 363/41; 363/95; 363/131; 363/26; 327/254

[58] Field of Search .................................. 363/41, 95, 26, 363/131, 97, 132; 327/254

[56] References Cited

U.S. PATENT DOCUMENTS

4,473,732  9/1984  Payne ........................................ 363/133

*Primary Examiner*—Peter S. Wong
*Assistant Examiner*—Rajnikant B. Patel
*Attorney, Agent, or Firm*—William E. Pelton, Esq.

[57] ABSTRACT

A PWM controlling circuit includes a signal generator and two PWM controllers. The signal generator comprises an oscillator, a plurality of inverters, and two RC delay networks. The oscillator and the inverters are composed of elementary elements, respectively, such as diodes, resistors, inverters and capacitors. The PWM controlling circuit in accordance with the present invention can be implemented with low cost, and the duty cycles thereof are not limited to 50%.

6 Claims, 10 Drawing Sheets

PULSE-WIDTH-MODULATION CONTROL CIRCUIT

BACKGROUND OF THE INVENTION

1. Field of the Invention

The present invention relates to a pulse width modulation (PWM) controlling circuit, more particularly, to a PWM controlling circuit for a switching power supply.

2. Description of Related Art

Various switching power supplies are available currently, which will be simply described in the following descriptions in conjunction with the accompanying drawings.

Figure 1:
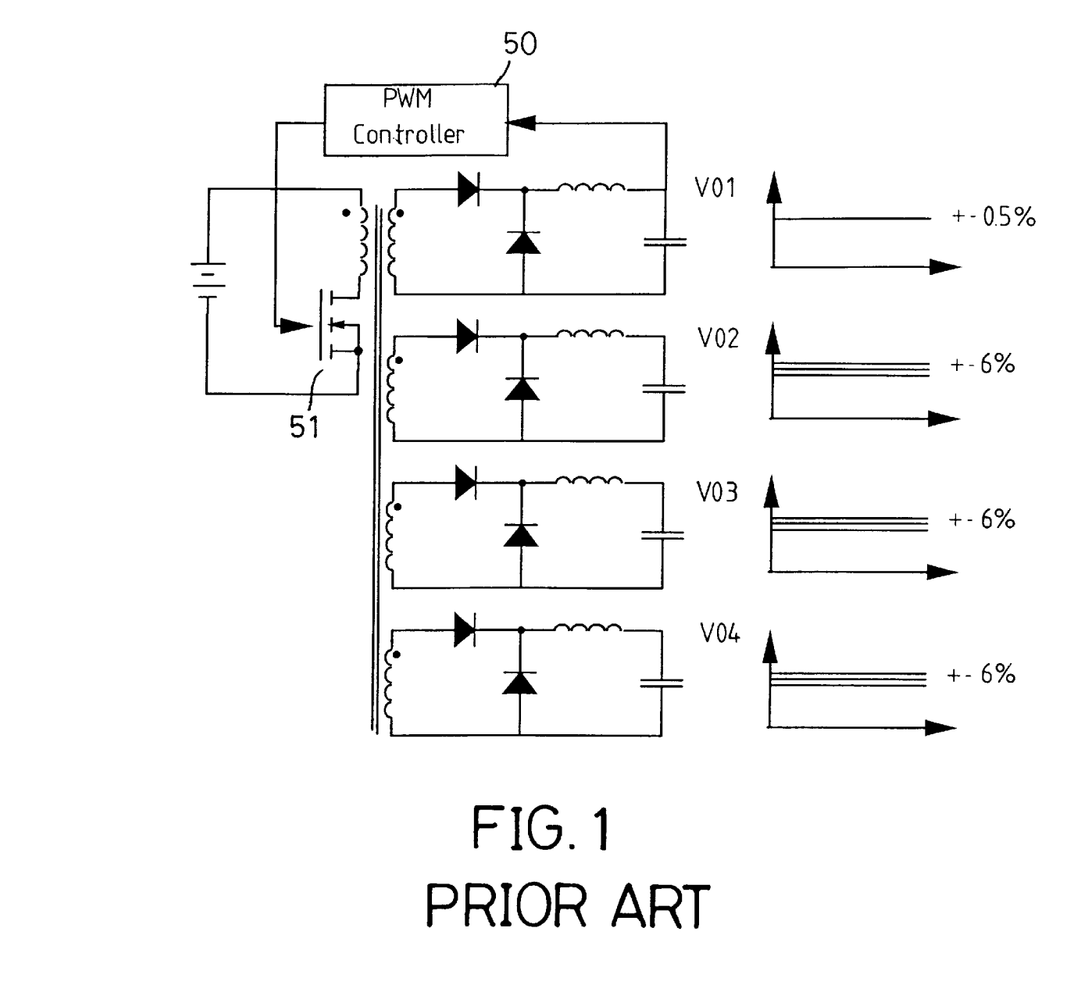
FIG. 1 shows a conventional switching power supply having a single PWM controller.

Referring to FIG. 1, which shows a conventional switching power supply, the switching power supply comprises a PWM controller 50, a switching transistor 51, a transformer with four secondary windings and four rectifying and filtering circuits respectively connected with the secondary windings. The switching power supply of FIG. 1 has four output voltages V01–V04. Only the first output voltage V01 is fed back to the PWM controller 50 as a feed-back signal. Accordingly, only the first output voltage V01 is regulated, and the regulation of each of the other output voltages V02, V03 and V04 is poor.

Figure 2:
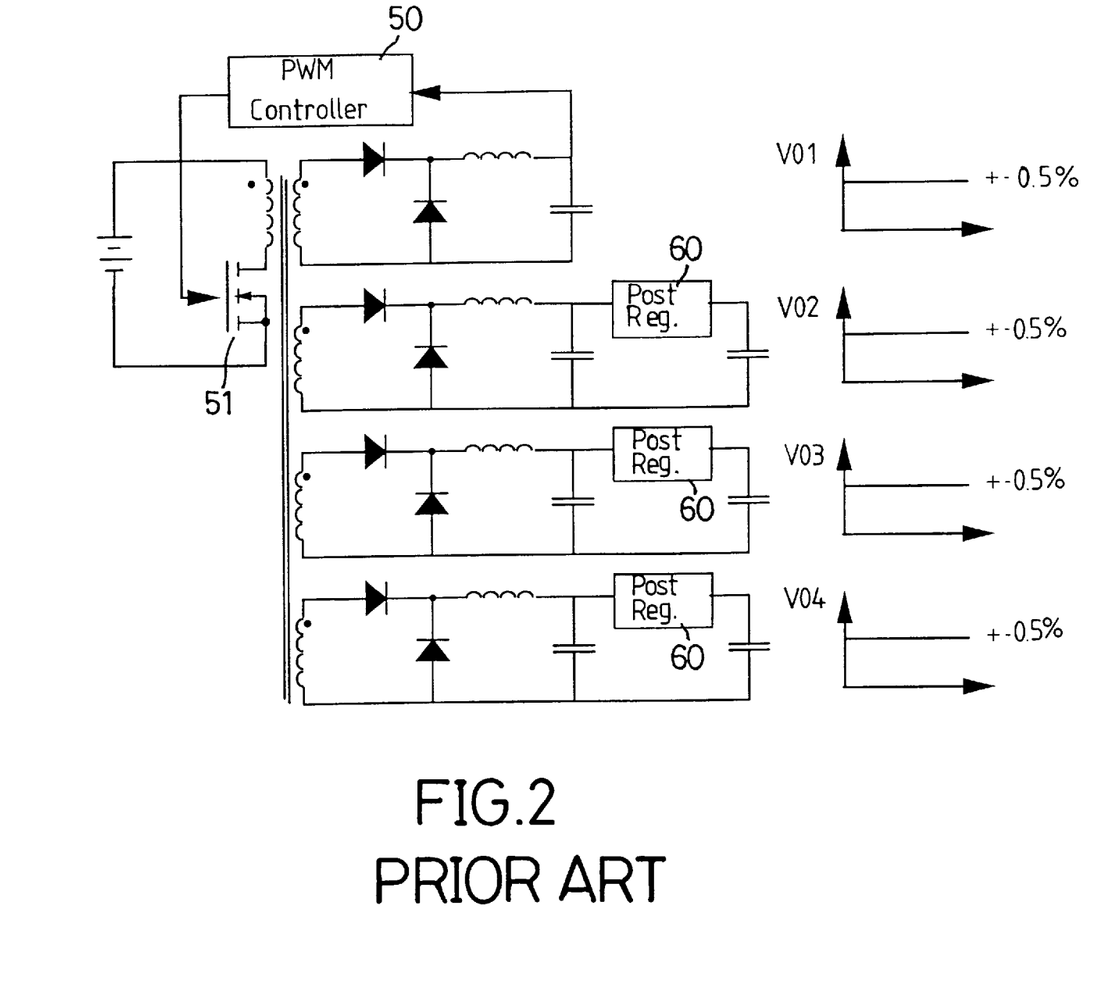
FIG. 2 shows a conventional switching power supply improved from the switching power supply of FIG. 1.

Focusing on the above problem, an improved design is provided, as shown in FIG. 2. The structure of FIG. 2 is similar to that of FIG. 1 except that a post regulator 60 is provided to each of the outputs V02, V03 and V04. Although the provision of the post regulators 60 can promote the regulation of the output voltages V02, V03 and V04, the conversion efficiency of each post regulator 60 is low resulting in a need for heat sink or the like, which occupy a lot of space.

Figure 3:
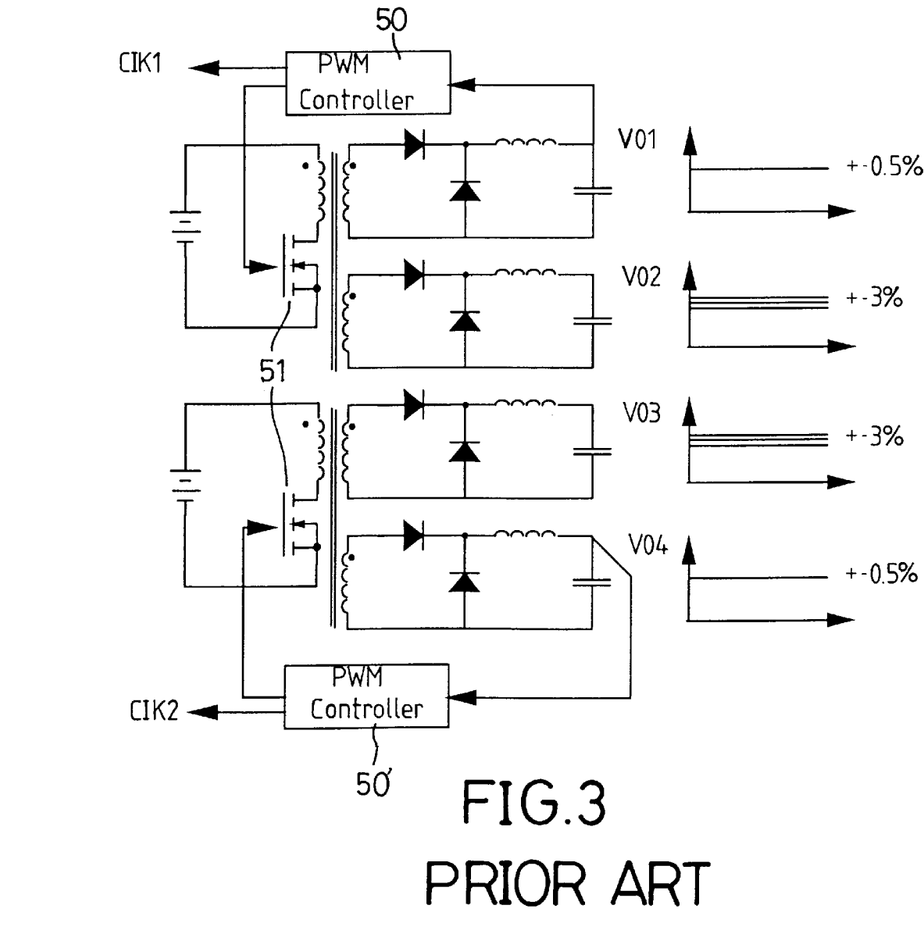
FIG. 3 shows a conventional switching power supply having two separate PWM controllers.

FIG. 3 shows a conventional switching power supply, which is similar to that of FIG. 1 except that it utilizes two PWM controllers 50, 50'. As in the switching power supply of FIG. 1, the output voltage V01 is fed back to the first PWM controller 50, while the output voltage V04 is fed back to the second PWM controller 50'. Accordingly, the output voltages V01 and V04 appear to be regulated, but the regulation of the output voltages V02 and V03 is still poor. In addition, ideally, the two PWM controllers 50 and 50' should be exactly the same. However, this is impossible for the actual elements. Accordingly, oscillating frequencies of respective clock signals Clk1 and Clk2 of the respective two PWM controllers 50 and 50' are always slightly different, thereby causing a phenomenon of beat frequency.

Figure 4:
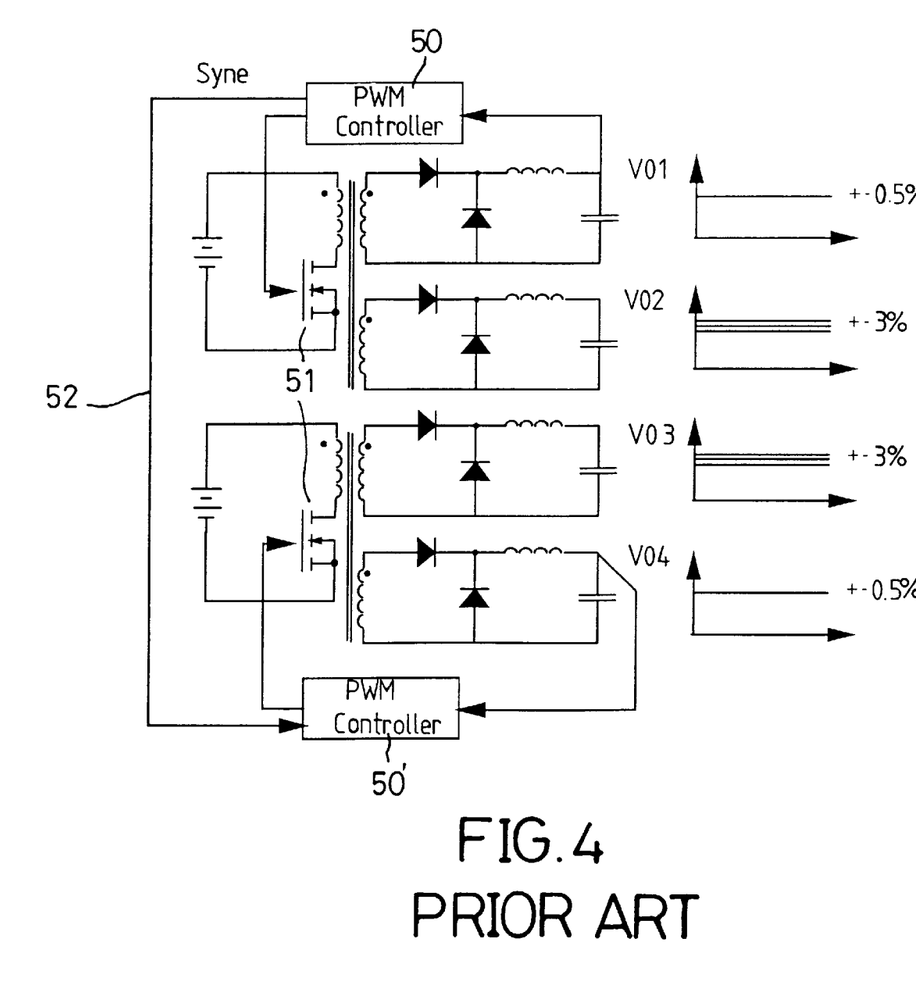
FIG. 4 shows a conventional switching power supply having two PWM controllers connected with each other.
Figure 5:
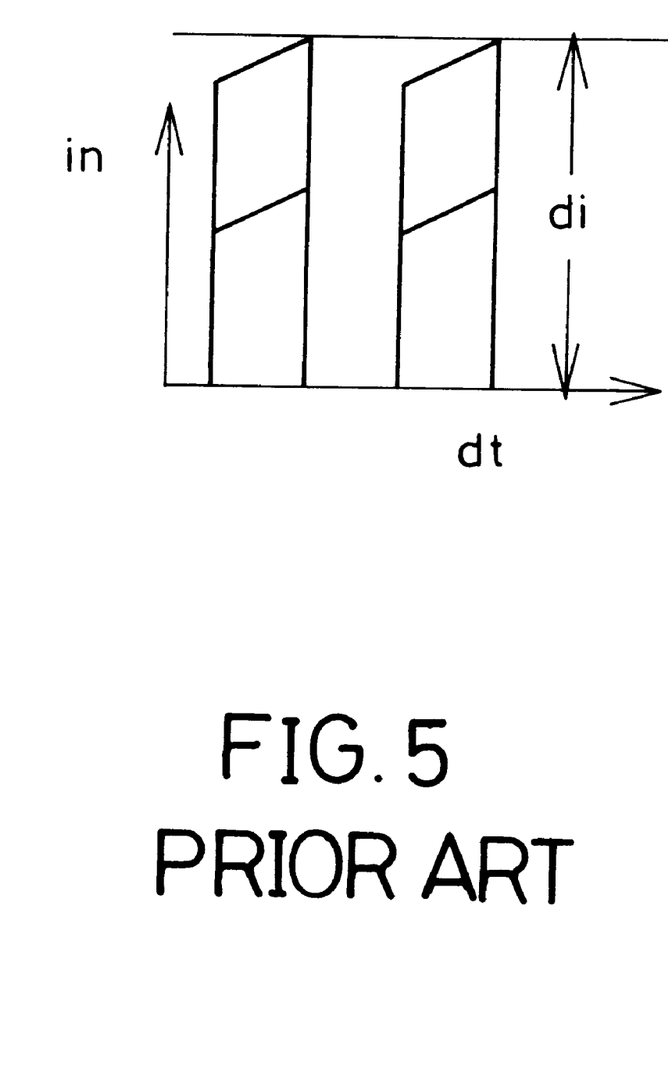
FIG. 5 is a graph illustrating instantaneous current of the switching power supply of FIG. 4.

Referring to FIG. 4, another conventional switching power supply provided for improving the phenomenon of beat frequency mentioned above is shown. In the structure of FIG. 4, the two PWM controllers 50 and 50' are connected with each other via a synchronization signal line 52, so that the two PWM controllers 50 and 50' can be synchronous with each other. However, such a design results in serious electromagnetic interference. Since the two PWM controllers are in on and off statuses synchronously, causing considerable instantaneous current (di) is generated to flow in the circuit, as shown in FIG. 5. Accordingly, noises and electromagnetic interference are serious problems for such a design.

Figure 6:
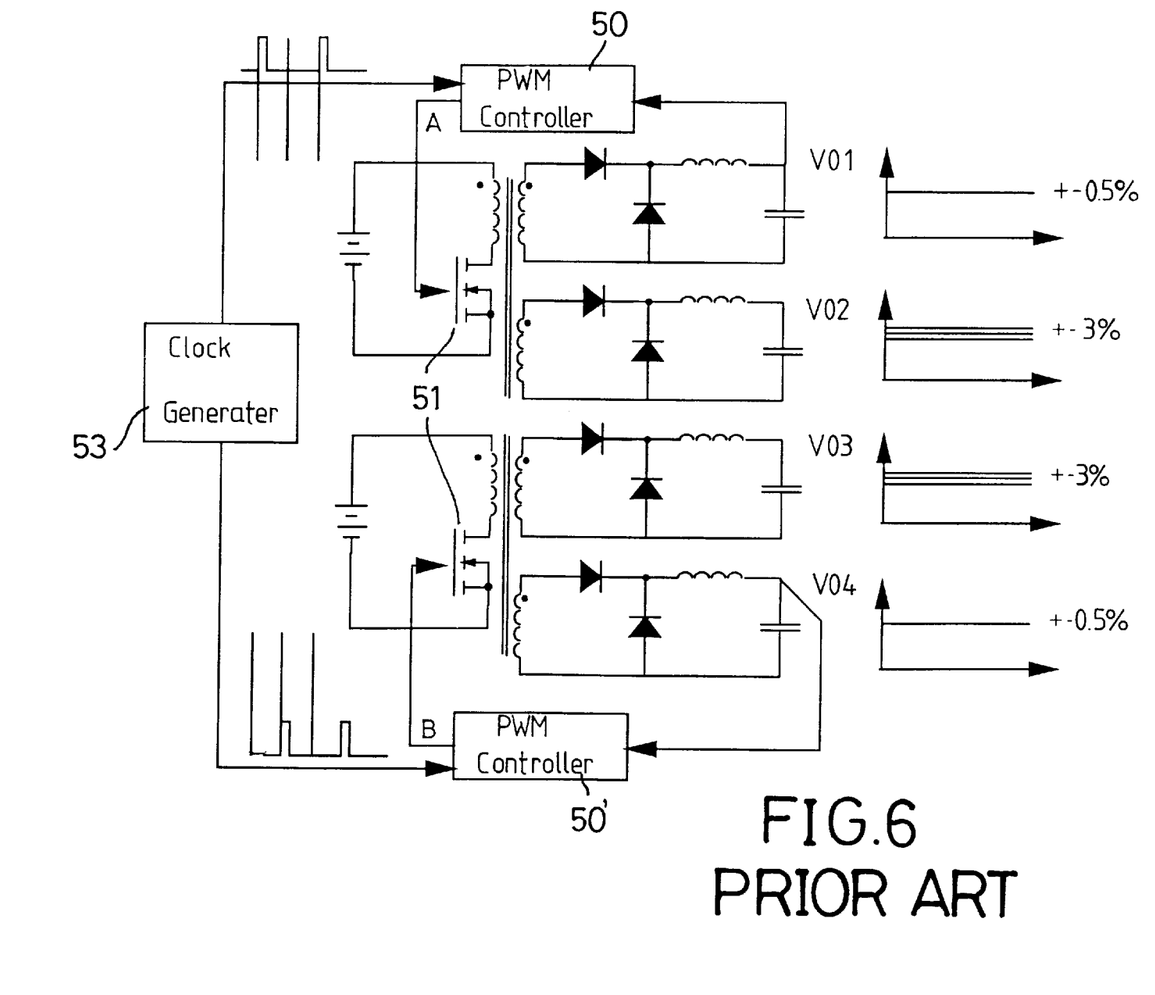
FIG. 6 shows a conventional switching power supply having a clock generator and two PWM controller.
Figure 7:
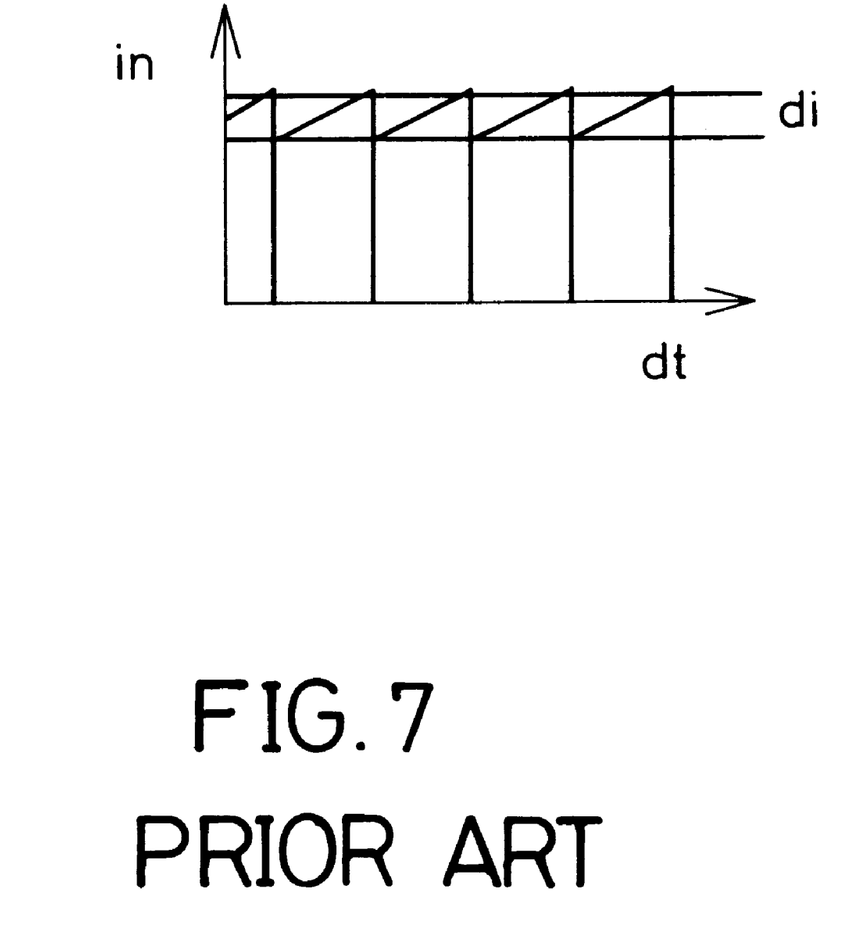
FIG. 7 is a graph illustrating instantaneous current of the switching power supply of FIG. 6.

Referring to FIG. 6, a further conventional switching power supply is shown. In this structure, a clock generator 53 is used to generate two signals, which are synchronous but different in phase, as clock signals for the respective two PWM controllers 50 and 50'. The two PWM controllers 50 and 50' accordingly operate alternately, thus the instantaneous current (di) is low, as shown in FIG. 7.

Figure 8:
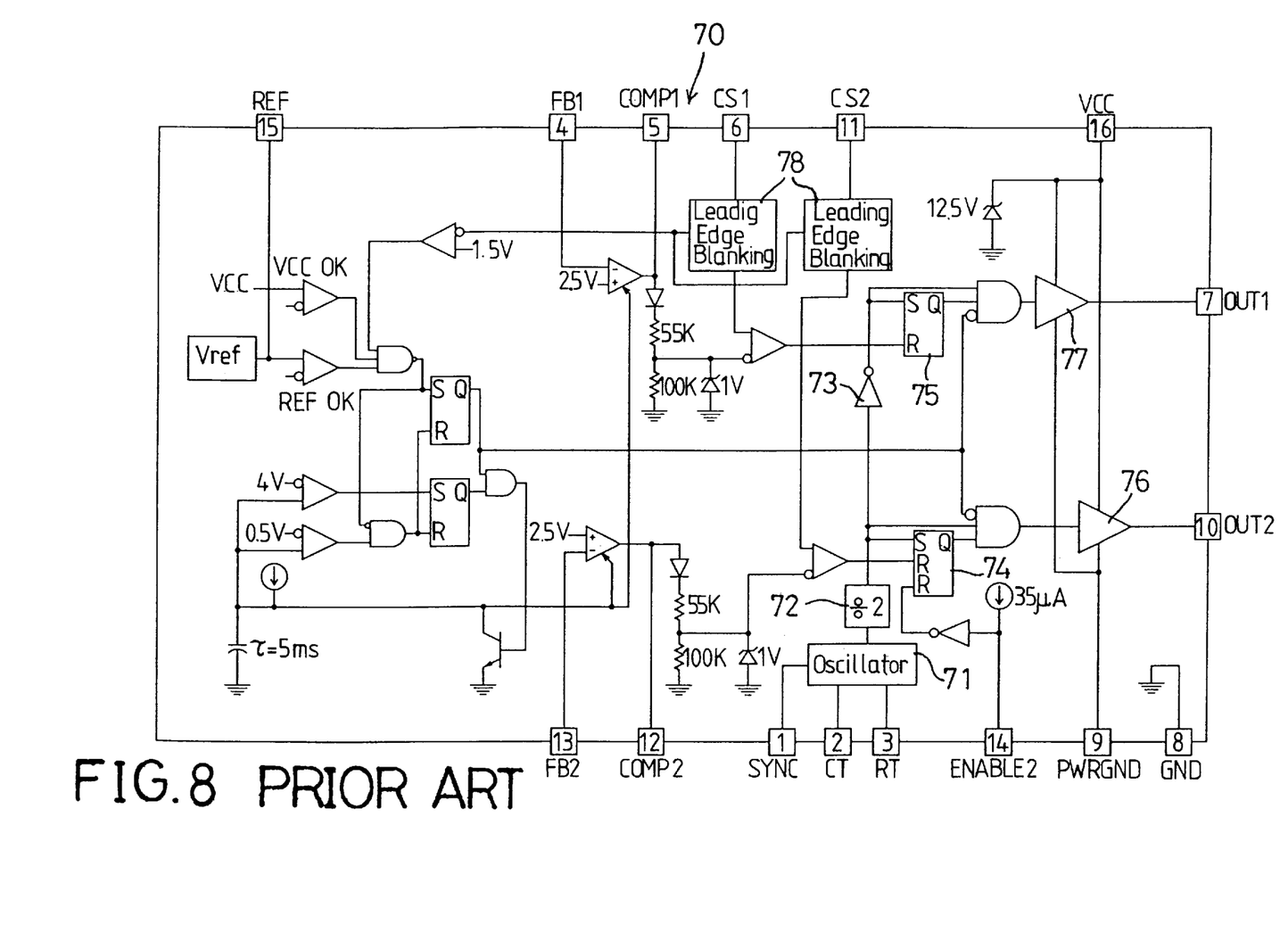
FIG. 8 is a circuit diagram of a conventional PWM controlling circuit.

In application, the two PWM controllers 50, 50' and the clock generator 53 are integrated on a single IC, such as a dual current mode PWM controlling circuit 70 of a series UCC1810-3810 produced by UNITRODE, as shown in FIG. 8. The IC of the dual current mode PWM controlling circuit 70 comprises two output terminals OUT1, OUT2, an oscillator 71, a frequency divider 72, an inverter 73, two RS flip-flops 74, 75, two buffers 76, 77, and two leading edge blanking devices 78. Outputs from the output terminals OUT1 and OUT2 are synchronous but different in phase.

However, the cost of such an IC is very high. In addition, the two outputs from the output terminals OUT1 and OUT2 are inverse in phase, and the duty cycles of the respective output cannot exceed 50%.

Accordingly, the present invention is directed toward overcoming the above problem of the conventional dual current mode PWM controlling circuit.

SUMMARY OF THE INVENTION

One object of the present invention is to provide a PWM controlling circuit with low cost.

Another object of the present invention is to provide a PWM controlling circuit, wherein the duty cycles of two outputs of the circuit can be set respectively, so that the duty cycles are not limited to 50%.

In accordance with one aspect of the present invention, the PWM controlling circuit comprises a signal generator and two PWM controllers. The signal generator comprises an oscillator, a plurality of inverters, and two RC delay networks. The oscillator and the inverters are composed of elementary elements, respectively, such as diodes, resistors, inverters and capacitors.

Other objects, advantages and novel features of the invention will become more apparent from the following detailed description when taken in conjunction with the accompanying drawings.

DETAILED DESCRIPTION OF PREFERRED EMBODIMENT

Figure 9:
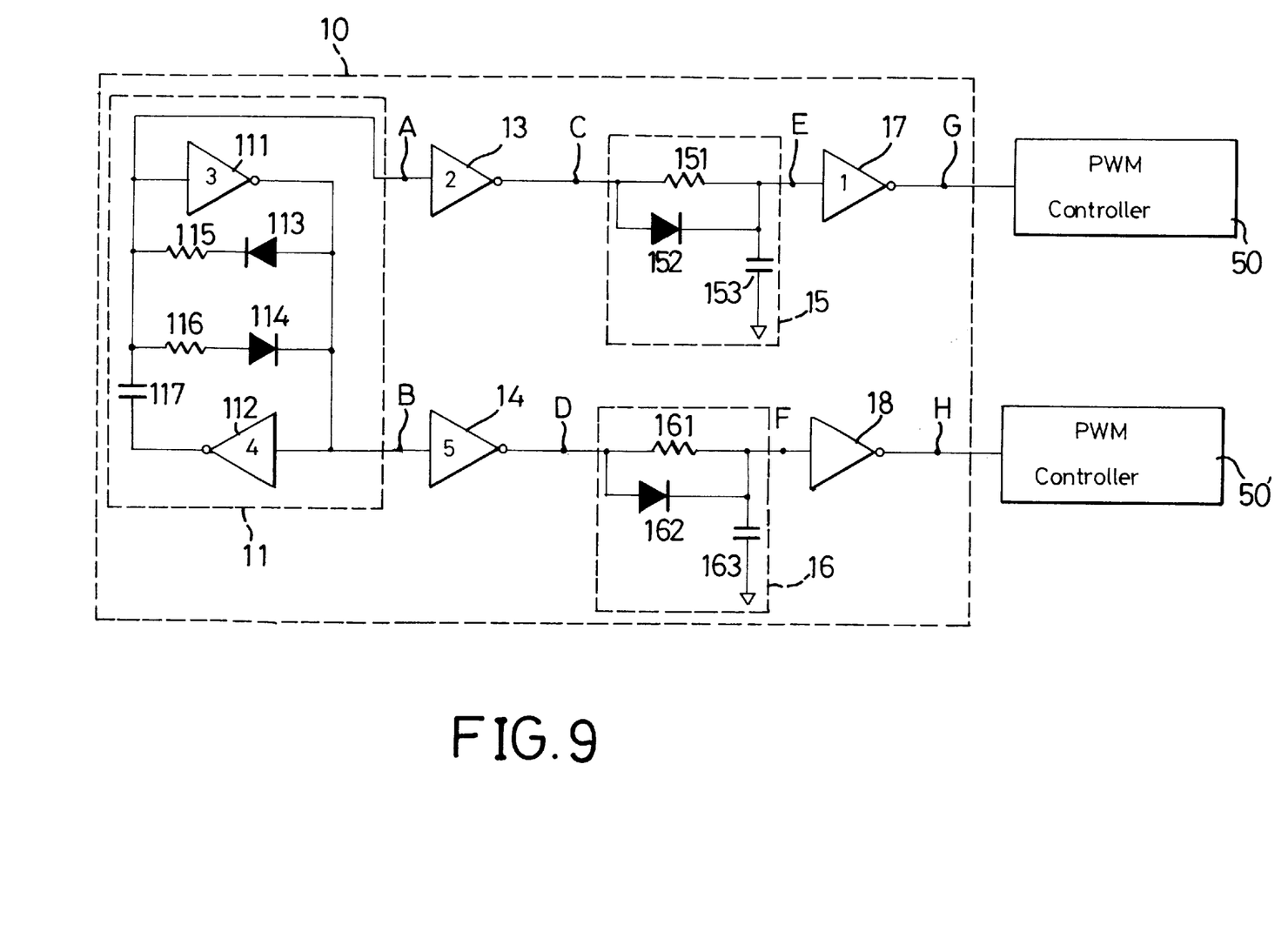
FIG. 9 is a schematic circuit diagram of a PWM controlling circuit in accordance with the present application.

Referring to FIG. 9, a PWM controlling circuit in accordance with the present invention is shown. As in the conventional PWM controlling circuit 70, the PWM controlling circuit in accordance with the present invention comprises a signal generator 10, and two PWM controllers 50, 50'. The signal generator 10 of the present invention comprises an oscillator 11 having two outputs A and B, which respectively output synchronous signals with opposite phases, two inverters 13 and 14 connected with the outputs A and B, respectively, two RC delay networks 15, 16 connected with said two inverters 13, 14, respectively, and another two inverters 17, 18 connected with the two RC delay networks 15, 16, respectively. Respective outputs G, H of the two inverters 17 and 18 are connected to trigger the two PWM controller 50, 50'. It is noted that the PWM controllers 50, 50' can be conventional single output current mode PWM controllers, as found in the prior art.

As shown in the drawing, the oscillator 11 is composed of two diodes 113 and 114, two resistors 115 and 116 respectively connected in series with said two diodes 113 and 114, two inverters 111 and 112 connected with the diodes 113 and 114, and a capacitor 117. The two resistors 115 and 116 construct RC delay loops with the capacitor 117, respectively. High and low transition points of the two outputs A and B of the oscillator 11 can be adjusted by varying the resistances of the respective resistors 115 and 116, so that the respective durations of the positive and negative waveforms of each output of the oscillator 11 can be adjusted to be 1:1. The RC delay network 15 consists of a diode 152, a resistor 151, and a capacitor 153. Likewise, the RC delay network 16 consists of a diode 162, a resistor 162, and a capacitor 163. Those portions of the signal generator 10 are all constructed with simple basic elements.

The operation of the signal generator 10 of the PWM controlling circuit in accordance with the present invention will be described in detail with reference to FIG. 10, as follows.

As mentioned above, the two outputs of the oscillator 11 are indicated by A and B. In addition, the respective outputs of the two inverters 13 and 14 are indicated by C and D, the respective outputs of the RC delay networks 15 and 16 are indicated by E and F, and the respective outputs of the inverters 17 and 18 are indicated by G and H.

Figure 10:
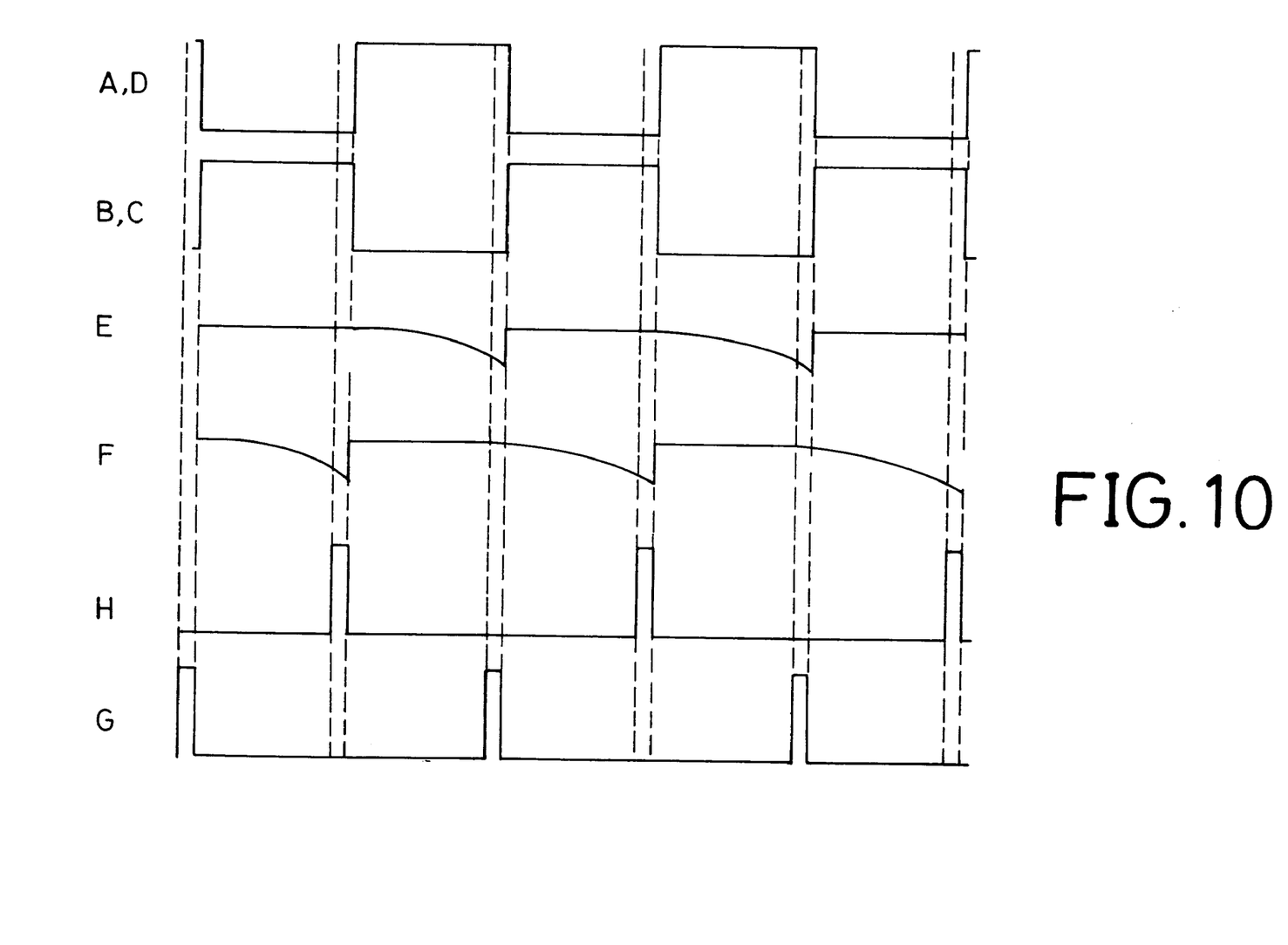
FIG. 10 is a timing chart showing the operation of the PWM controlling circuit of FIG. 9.

As shown in FIG. 10, the output signals at the nodes A and B are synchronous rectangular waves with opposite phases. The two signals then pass through the inverters 13 and 14, respectively, to be buffered and isolated. The signals at nodes C and D are inverted waveforms of the signals at nodes A and B, respectively. The inverted signals then pass through the RC delay networks 15 and 16, respectively. The RC delay networks 15 and 16 function to charge rapidly as well as discharge smoothly. For example, when the signal at the node C goes to high, the terminal voltage of the capacitor 153 is charged rapidly to high level via the diode 152. When the signal at the node: C transits to low, the capacitor 153 discharges smoothly via the resistor 151, so that the signal at node E (F) is of the waveform as shown in FIG. 10. The signals at the node F is also formed by the same manner. The signals of the nodes E and F pass through the inverters 17 and 18 to be formed as narrow-pulse signals (signals at the nodes G and H). As shown in this drawing, the falling edges of the signals of the nodes G and H are aligned with the falling edges of the signals of the nodes A and B, respectively. Accordingly, the two signals at the nodes G and H are synchronous but different in phase.

The PWM controlling circuit in accordance with the present invention with the above construction can be implemented by simple and basic electronic elements with low cost. Furthermore, in this design, the duty cycle of each of the two PWM controller 50 and 50' can be adjusted individually. Therefore, the PWM controlling circuit in accordance with the present invention can overcome the limit of duty cycle for the prior art (the duty cycle for the conventional PWM controlling circuit 70 cannot exceed 50%).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pulse width modulation (PWM) controlling circuit comprising:
   an oscillator having a first output and a second output for outputting two synchronous signals with a predetermined phase shift therebetween;
   a first RC delay network and a second RC delay network respectively connected to said first and second outputs of said oscillator, said first and second RC delay networks generating two narrow pulses with said predetermined phase shift therebetween;
   a first PWM controller connected with said first RC delay network to receive one of said two narrow pulses to be triggered thereby; and
   a second PWM controller connected with said second RC delay network to receive the other of said two narrow pulses to be triggered thereby.

2. The PWM controlling circuit as claimed in claim 1, further comprising two inverters, one of which is connected between said first output of the oscillator and said first RC delay network, the other one is connected between said second output of the oscillator and said second RC delay network.

3. The PWM controlling circuit as claimed in claim 2, further comprising another two inverters, one of which is connected between said first RC delay network and said first PWM controller, and the other one is connected between said second RC delay network and said second PWM controller.

4. The PWM controlling circuit as claimed in claim 1, further comprising two inverters, one of which is connected between said first RC delay network and said first PWM controller, and the other one is connected between said second RC delay network and said second PWM controller.

5. The PWM controlling circuit as claimed in claim 1, wherein said oscillator comprises two diodes, two inverters, two resistors and a capacitor.

6. The PWM controlling circuit as claimed in claim 1, wherein each of said first and second RC delay networks comprises a diode, a capacitor and a resistor.

* * * * *